I. S. MERRELL.
CONDENSING PROCESS AND APPARATUS.
APPLICATION FILED SEPT. 16, 1916.
1,410,492.
Patented Mar. 21, 1922.
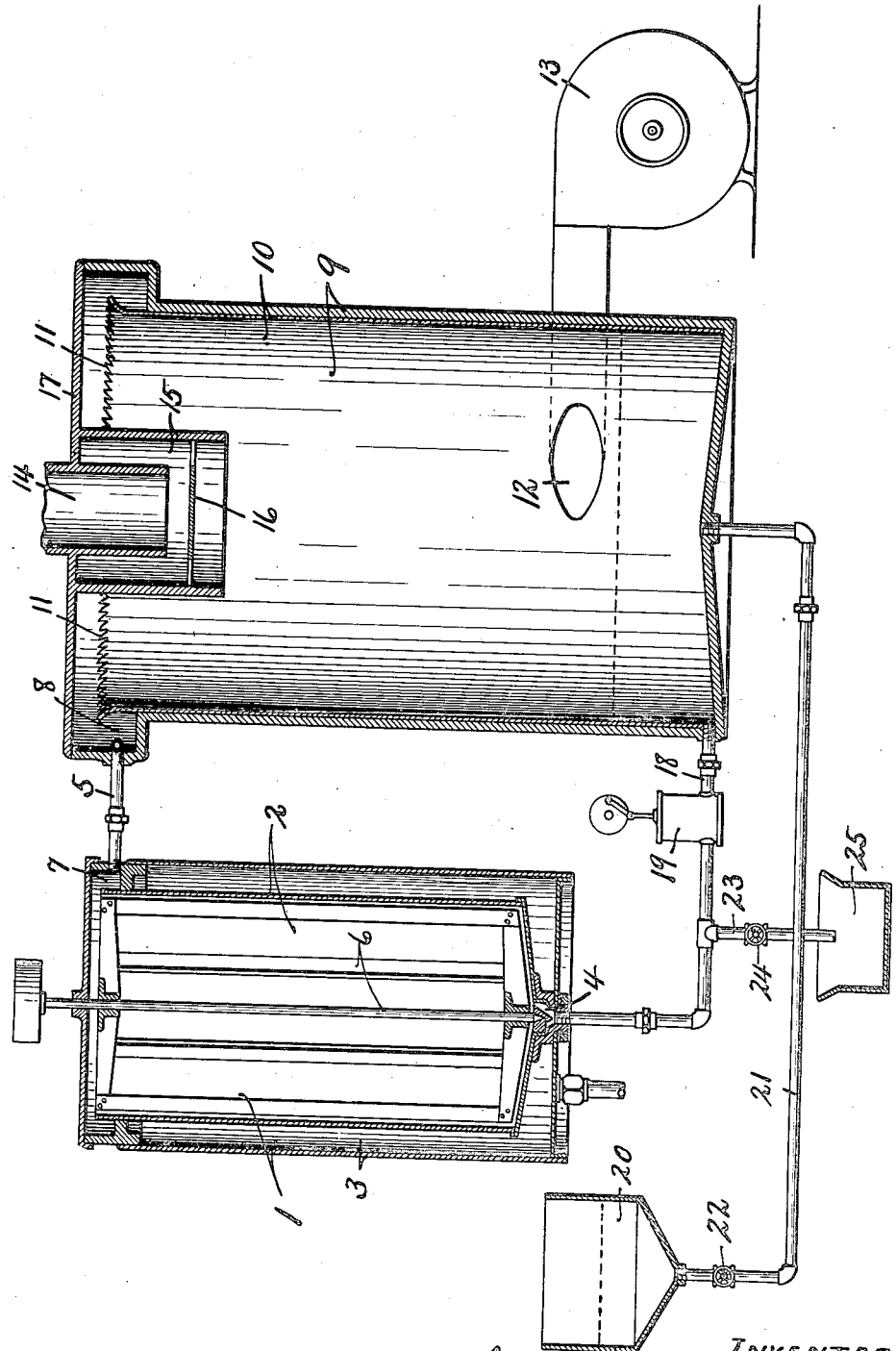
INVENTOR
BY Irving S. Merrell
Howard P. Denison
ATTORNEY

UNITED STATES PATENT OFFICE.

IRVING S. MERRELL, OF SYRACUSE, NEW YORK, ASSIGNOR TO MERRELL-SOULE COMPANY, OF SYRACUSE, NEW YORK, A CORPORATION OF NEW YORK.

CONDENSING PROCESS AND APPARATUS.

1,410,492.  Specification of Letters Patent.  Patented Mar. 21, 1922.

Application filed September 16, 1916. Serial No. 120,514.

*To all whom it may concern:*

Be it known that I, IRVING S. MERRELL, a citizen of the United States of America, and resident of Syracuse, in the county of Onondaga, in the State of New York, have invented new and useful Improvements in a Condensing Process and Apparatus, of which the following, taken in connection with the accompanying drawings, is a full, clear, and exact description.

This invention relates to certain improvements in condensing process and apparatus, and is particularly designed and peculiarly adapted for the concentration of milk.

The present known commercial apparatus (generally known as a vacuum pan) involves an expensive construction embodying means for producing high vacuum so that the liquid constituents of the milk will vaporize at low temperature, preventing injury to the solid constituents of the milk.

Further, the operation of a vapor-condensing apparatus which involves the only practical method of producing the high vacuum required necessitates the use of large quantities of water ranging anywhere from six thousand to twelve thousand gallons per hour. Such amount of water cannot be obtained by many creameries, and in many cases even if such quantities were available, the expense of obtaining the same would be prohibitive.

Under various conditions, therefore, the present commercial apparatus cannot be utilized, and in many instances, such as the small creamery, the expense of purchasing and operating such an apparatus renders its use impractical, as such an apparatus can only be economically applied by persons controlling large supplies of milk.

The present known commercial process of condensing milk further consists in placing the milk in a large jacketed pan containing steam coils and subjecting the milk under vacuum to sufficient heat to boil the same until the proper degree of concentration has been attained.

This operation consumes from two to three hours and subjects the milk in practically stationary condition to the boiling heat of the jacket and coils for that period of time. Different portions of the milk are subjected to different temperatures in order to produce boiling throughout the mass of milk, as it is necessary to heat the milk adjacent the heating surfaces to a much higher temperature than that theoretically necessary for boiling in vacuum.

The concentration of the milk is due entirely to the vaporization of the liquid constituents by subjecting the milk in a stationary body to a boiling temperature, and in order to prevent the destruction of the milk, a high vacuum is essential to produce boiling at relatively low temperature.

The object, therefore, of the present invention is to produce a condensing apparatus of relatively inexpensive construction, but of economic operation and adapted for practical use by the small as well as the large creamery or individual producer of milk, by reason of the fact that the apparatus is susceptible of operation in the production of large quantities of good commercial condensed milk without the use of vacuum, the concentration being produced while the milk is flowing in a sheet at a temperature below 212°, and I have produced by the process and apparatus herein described, without the use of vacuum, condensed milk in which the albumen was 100 per cent soluble.

Other advantages will appear from the following description taken in connection with the accompanying drawings, in which—

The figure is a vertical plan view, partly in section, of an apparatus adapted to carry out the process herein.

The apparatus, as shown, comprises a suitable milk heater or pasteurizer —1— which may be of any known form or construction, and, as shown, embodies a vertically disposed chamber —2— provided with a suitable steam jacket —3—. The chamber —2— is provided with an inlet —4— for the milk and an outlet —5— adapted to convey the milk to the condensing chamber, hereinafter described.

As shown, the heating chamber may contain a suitable rotary beater —6— to assist in uniformly heating the milk and in the elevation of the milk through the chamber —2— and the pipe —5—. As shown, the chamber —2— may discharge its milk into the trough —7— concentric with the chamber —2— and adjacent its upper edge with which trough the pipe —5— communicates.

The jacket —3— is provided with a suitable steam inlet, not shown, and condensation outlet. The pipe —5— leads to the trough or circular chamber —8—, formed at the upper portion of and surrounding a concentrating chamber —9— and preferably the pipe is provided with a bent or turned end portion —5′— adapted to produce a continuous circulation of the milk around trough —8—.

The concentrating chamber —9— is vertically arranged and circular in form and embodies a cylindrical wall —10— having its upper edge flanged outwardly and forming the inner wall of the trough —8—.

Preferably the upper edge of the cylinder —10— is serrated or provided with a series of notches or V-shaped grooves for allowing the milk to pass in streams from the trough —8— to the interior surface of the cylinder —10— without overflowing from the entire upper edge of the cylinder and to make an even distribution of the flow of the milk down the wall —10—. The streams commingle after leaving the serrations.

The streams of milk issuing from the serrations —11— are prevented from falling to the bottom of the chamber —9— by reason of the fact that the upper edge of the cylinder is turned outwardly and the streams remain at substantially all times in contact with the inner surface of the cylinder —10—.

A suitable inlet —12— for a forced current of air is provided, and preferably the air is discharged tangentially into the chamber as forced by a suitable fan or blower —13— of proper size and driven at sufficient speed to produce the required body of air.

The air entering the chamber through the inlet —12— rotates within the chamber and tends to remain in contact with the inner surface thereof as it moves spirally upwardly along the interior surface of the cylinder —10— and comes in contact with the milk flowing down the interior surface of the cylinder, and escapes through the outlet —14— at the top of the chamber.

Preferably the outlet —14— is formed in a tubular member extending downwardly into the central upper portion of the chamber —9— and is surrounded by a concentric cylinder —15— or tubular member of greater diameter than the pipe forming the outlet —14— and terminating a short distance below the end of the pipe and formed with an interior baffle —16— aligned with the inlet —14— to prevent the direct passage of the air to outlet —14—. The outlet —14— and the tube —15— may be formed in connection with a removable top —17— if desired.

The condensed milk collects in the bottom of chamber —9— and flows outwardly through pipe —18— and is returned to the heater or pasteurizer and preferably a suitable pump —19— is included in this connection for assisting in forcing the milk through the pasteurizer and into the trough —8—.

Milk may be continuously supplied to the chamber —9— in an amount substantially equal to the liquid vaporized, or after the proper degree of concentration in the unit of milk has been reached, milk may be continuously supplied to the apparatus and continuously withdrawn in any amount desired, and for this purpose a tank —20— may be utilized for containing the milk, the tank being connected with the chamber —9— by a pipe —21— including a controlling valve —22—. A discharge pipe —23— for the condensed fluid may likewise be provided and may, as shown, embody a controlling valve —24— and the tank —25—, as shown, for receiving the condensed milk.

The outer wall of the chamber —9— and the chamber itself may be formed of any suitable material, and preferably consists of or embodies as an additional limitation an insulating wall tending to prevent the radiations outwardly of heat from the milk while flowing in a sheet upon the interior surface of the cylinder —10—.

The operation consists in a substantially continuous movement of the milk through the heater,—then through the condensing chamber, and thence back to the heater, and consists of alternate heating and concentration while flowing in a sheet in a heated condition.

The operation of the apparatus is as follows: The milk is first heated by the heater —1— and discharged or forced into the trough —8—, the quantity discharged being so regulated that its escape from the trough through the serrations —11— will not exceed the quantity which can flow in a thin sheet or film upon the inner surface of the cylinder —10—.

The air forced into the chamber —9— by fan —13— is preferably at normal room temperature and drives off the vapor from the milk and carries it out through the outlet —14—. The theory of the action of the air upon the heated milk, resulting in concentration of the milk, is more or less a matter of intelligent speculation, and the applicant hesitates to state positively any definite theory and desires to confine himself to the fact that the concentration is effected.

However, with this reservation, the applicant suggests that the forced current of air overcomes the vapor tension of the milk while flowing in a sheet or film and, as a result, mechanically drives off the vapor from the milk, resulting in a concentration, the rapidity of the action resulting from the large surface of the milk exposed.

The milk collecting in the bottom of the chamber —9— is continuously returned to the heater —1—, reheated and again forced or discharged into the trough —8—.

This sequence of steps in the operation is continuously maintained until the desired degree of concentration is effected, and with an apparatus of this character in which the condensing chamber was approximately four feet in diameter and six feet high, I have been able to condense approximately eight thousand (8000) pounds of milk in a ratio of four to one in ten hours without boiling the milk and without the use of any vacuum.

The capacity of an apparatus of any predetermined size depends considerably upon the temperature to which the liquid is heated before its introduction into the condensing chamber, and the solubility of the albumen in the resultant product likewise depends considerably upon the temperature to which the liquid is heated during the process.

By heating the liquid to a temperature of approximately 153°, a product was obtained in which the albumen was 100 per cent soluble, but the capacity of the apparatus was not as great as when the liquid was heated to higher temperatures, and I have utilized the apparatus in the production of good commercial condensed milk by heating the milk to temperatures as high as 190° F., and as the complete solubility of the albumen is not essential to condensed milk for many purposes, it will often be advantageous to utilize the higher capacities of the apparatus somewhat at the expense of solubility of the albumen in the product.

Nevertheless, at temperatures below 160°, I am able to produce, without the use of vacuum, large quantities of condensed milk in which the albumen is entirely soluble, and with an apparatus of the size heretofore utilized, the capacity in the production of such a product reaches approximately forty-five hundred (4500) pounds of milk in ten hours condensed in a ratio of four to one.

The production of such a product without the use of high vacuum, so far as I know, has never heretofore been accomplished, and is remarkable when considered in connection with the fact that in commercial condensed milk produced under high vacuum, the albumen is often not more than 70 per cent soluble.

The milk may, therefore, be heated to any desirable temperature, and I desire to claim herein specifically, in addition to the broader features of the invention, the production preferably at relatively high temperatures without the use of vacuum of a product in which the albumen is substantially entirely soluble.

Although I have shown and described one particular method and one specific apparatus as utilizable in carrying out the method, I do not desire to limit myself to the same, as any suitable heating means may be utilized and in cases may be omitted and any suitable means for subjecting the milk while flowing in a sheet or film to the action of a forced current of air may be substituted for the condenser —9—.

However, I desire to claim certain specific features of the process described in combination with the essential portions as preferable. Nevertheless, various changes and omissions may be made in the details of the process and in the form and structure of the apparatus without departing from the spirit of this invention as set forth in the appended claims.

What I claim is:

1. The process of concentrating milk and the like, comprising heating the milk, introducing the heated milk into a trough at the upper end of a tubular container, permitting the milk to overflow from said trough in a plurality of streams uniting upon the surface of the container to form a continuous layer, permitting said layer to flow downwardly upon the interior surface of said container and introducing a forced current of rotating air into said container in such a manner that the air moves in a general direction opposed to the direction of movement of the layer of liquid.

2. The process of concentrating milk comprising repeatedly and intermittently heating the milk, and after each heating introducing the milk into one end of a tubular container, causing the milk to flow endwise in the container in the form of a thin layer upon the interior surface of said container, thereby forming a relatively large interior zone unobstructed by the moving milk, and subjecting said milk during movement in layer form to contact with a forced current of air moving spirally of the container, and in an axial direction opposed to the direction of movement of the layer of milk.

In witness whereof I have hereunto set my hand this 13th day of August, 1916.

IRVING S. MERRELL.

Witnesses:
E. A. THOMPSON,
HOWARD P. DENISON.